US011712773B1

(12) United States Patent
Goettler et al.

(10) Patent No.: US 11,712,773 B1
(45) Date of Patent: Aug. 1, 2023

(54) MACHINE TOOL OPERATIONS OPTIMIZATION

(71) Applicant: MSC Services Corp., Melville, NY (US)

(72) Inventors: James Paul Goettler, Cranberry Township, PA (US); Alan P. Yang, Saint James, NY (US); David Wayne Barton, Port Matilda, PA (US)

(73) Assignee: MSC Services Corp., Melville, NY (US)

( * ) Notice: Subject to any disclaimer, the term of this patent is extended or adjusted under 35 U.S.C. 154(b) by 0 days.

(21) Appl. No.: 17/546,197

(22) Filed: Dec. 9, 2021

(51) Int. Cl.
*B23Q 15/12* (2006.01)
*G05B 19/4093* (2006.01)

(52) U.S. Cl.
CPC ....... *B23Q 15/12* (2013.01); *G05B 19/40938* (2013.01); *G05B 2219/32216* (2013.01)

(58) Field of Classification Search
None
See application file for complete search history.

(56) References Cited

U.S. PATENT DOCUMENTS

| | | | |
|---|---|---|---|
| 5,170,358 A | 12/1992 | Delio | |
| 6,085,121 A | 7/2000 | Stern | |
| 7,177,713 B2 | 2/2007 | Smith et al. | |
| 8,131,525 B2 | 3/2012 | Schmitz et al. | |
| 10,596,642 B2 | 3/2020 | Trecapelli et al. | |
| 2019/0061083 A1 | 2/2019 | Trecapelli et al. | |

OTHER PUBLICATIONS

Author Unknown, Machining Dynamics & MRO, website article, date unknown, 5 pages, published at www.blueswarf.com.

*Primary Examiner* — Ryan A Jarrett
(74) *Attorney, Agent, or Firm* — Patent Technologies, LLC; Robert D. Gunderman, Jr.

(57) ABSTRACT

A system and method for machine tool operations optimization is disclosed. The computer based system contains vibrational data for at least one machine tool, where the vibrational data is used to determine optimal machining parameters for the machine tool and where an amount of profit improvement gained by adopting the optimal machining parameters is calculated.

7 Claims, 9 Drawing Sheets

Fig. 5

600

Indexable Milling Parameters
Test Objective: Improve Tool Life

| | Current | MSC Actual |
|---|---|---|
| Supplier | S G S TOOL COMPANY INC | SECO |
| Tool Part # | 1234 | 56931041 |
| Material | Non-Ferrous Metal (N) | Non-Ferrous Metal (N) |
| Material Grade | 6061 | AL 6061 |
| Number Of Flutes | 2 | 2 |
| Number Of Edges / Insert | 2 | 2 |
| Cutter Diameter In Inches | 0.31 | 0.32 |
| Number Of Effective Teeth | 2 | 2 |
| Surface Feet / Minute | 240 | 240 |
| Inches / Tooth | 0.0021 | 0.0021 |
| Coolant | Flood | Flood |
| Insert Number | SCEM | MM08-08005-4520-E03 T60M |
| Insert Grade | C2 | T60M |
| Total Depth Of Cut | .060 | .065 |
| Width Of Cut (WOC) | .030 | .030 |
| Cut | Plunging | Plunging |
| Length Of Cut In Inches | .02 | .02 |
| Number Of Passes | 1 | 1 |
| Number Of Parts / Index | 100 | 2000 |
| Index Time In Seconds | 30 | 30 |
| Annual Part Production | 20000 | 20000 |
| Burden Rate / Hour | $100.00 | $100.00 |
| Insert Cost / Each | $75.00 | $45.00 |
| Tooling Cost Cutter Body | $0.00 | $0.00 |
| Additional Cost Savings | | $0.00 |
| Description Of Additional Cost Savings | | |
| Machining Parameters | | |
| Revolutions / Minute | 2,957 | 2,865 |
| Inches / Revolution | 0.0042 | 0.0042 |
| Inches / Minute | 12.42 | 12.03 |
| Linear Distance / Index In Inches | 0.00 | 0.00 |
| Cycle Time / Part In Seconds | | |
| Annual Insert Usage | 200 | 10 |
| Material Removal Rate | .02 | .02 |
| Percentage Productivity Increase | | 0% |
| Increased Annual Part Production | | 20,000 |
| Annual Cycle Time Savings In Hours | | 0.00 |
| Machining Cost | | |
| Annual Insert Cost | $15,000.00 | $450.00 |
| Tool Change Cost / Year | $166.67 | $8.33 |
| Cycle Time Cost / Year | $50.00 | $50.00 |
| Annual Insert Cost Savings | | $14,550.00 |
| Annual Tool Change Cost Savings | | $158.33 |
| Annual Cost Savings | | $14,708.33 |

NOTICE:
Data contained in this report is based upon a limited test sample and is intended for comparative purposes only. It is no guarantee of actual production results. The information is provided "as is" without warranty of any kind, whether expressed or implied.

Fig. 6

800

Indexable Drilling Parameters
Test Objective: Reduce Cycle Time

| | Current | MSC Actual |
|---|---|---|
| Supplier | ALLIED MACHINE & ENGINEERING | KENNAMETAL |
| Part Number | v/s | 01281195 |
| Material | Superalloys and Titanium (S) | Superalloys and Titanium (S) |
| Material Grade | refractalloy | refractalloy |
| Insert Number | n/a | dft030304hp |
| Insert Grade | n/a | kc7140 |
| Drill Diameter | 2.5 | 2.5 |
| Surface Feet / Minute | 100 | 500 |
| Inches / Revolution | 0.0010 | 0.0070 |
| Depth Of Cut | 4.5 | 4.5 |
| Holes / Part | 204 | 204 |
| Coolant | Thru | Thru |
| Coolant PSI | 50 | 50 |
| Number Of Parts / Index | 1 | 1 |
| Annual Part Production | 204 | 204 |
| Burden Rate / Hour | $168.00 | $168.00 |
| Number Of Inserts / Setup | 1 | 6 |
| Insert Cost / Each | 150 | 15 |
| Index Time / Insert Set In Seconds | 300 | 300 |
| Drill Body Cost / Year | $500.00 | $500.00 |
| Number Of Edges For Insert | 1 | 3 |
| Machine Horsepower | 20 | 20 |
| Pecks In Drilling Cycle | 0 | 0 |
| Additional Cost Savings | | $0.00 |
| Description Of Additional Cost Savings | | |
| Machining Parameters | | |
| Revolutions / Minute | 153 | 764 |
| Inches / Minute | 15 | 5.34 |
| Annual Insert Usage | 204 | 408 |
| Cycle Time / Part In Seconds | 18.000 | 3.600 |
| Percentage Productivity Increase | | 400% |
| Increased Annual Part Production | | 1,020 |
| Cycle Time Savings In Hours | | 4.00 |
| Annual Cycle Time Savings In Hours | | 816.00 |
| Machining Cost | | |
| Annual Insert Cost | $30,600.00 | $6,120.00 |
| Annual Indexing Cost | $2,856.00 | $2,856.00 |
| Cycle Time Cost / Part | $840.00 | $168.00 |
| Annual Cycle Time Cost | $171,360.00 | $34,272.00 |
| Annual Insert Cost Savings | | $24,480.00 |
| Annual Indexing Cost Savings | | $0.00 |
| Cycle Time Cost Savings / Part | | $672.00 |
| Annual Cycle Time Cost Savings | | $137,088.00 |
| Cost Savings / Part | | $792.00 |
| Drill Body Cost Savings / Year | | $0.00 |
| Annual Cost Savings | | $161,568.00 |

NOTICE:
Data contained in this report is based upon a limited test sample and is intended for comparative purposes only. It is no guarantee of actual production results. The information is provided "as is" without warranty of any kind, whether expressed or implied.

Fig. 8

MACHINE TOOL OPERATIONS OPTIMIZATION

BACKGROUND OF THE INVENTION

1. Field of the Invention

This disclosure relates generally to machine tools, and more particularly, to systems and methods that optimize machine tool operations,

2. Description of Related Art

Machining operations involve the use of a rotating spindle and an end tool to perform operations on metal such as milling, drilling, and cutting. It is well known in the industry that system noise such as chatter causes decreased throughput, increased tool wear, and, overall inferior machining operations. Historically, machine tool operators have varied the spindle speed to reduce system noise and thus increase the throughput of cutting operations while also increasing the life of the end tool. This involves much trial and error. and often times the so called "sweet spot" cutting speed is imprecise at best. In recent years there have been a number of studies related to machining dynamics, where the vibrational dynamics of the machine tool are studied and quantified such that optimal cutting speeds can be determined. While these machining, dynamics techniques are useful and reduce the previous trial and error involved in matching machine, tool and cutting speeds, they focus primarily on a single machine and a single operation. Modern machining operations are complex, and include not only the cutting and fabrication of material, but also include a myriad of choices related to end took and their supply availability, lead times of end tools and material stock, as well as profitability management and improvement and predictive supply chain planning.

What is needed is a system and method for optimizing machine tool operations that includes not only optimization of the machine tool itself, but also considers supply chain parameters such as end tool and material stock lead times, supplier variability, cost savings and profitability management and improvement.

The present invention provides such a system and method, as further described herein. Various embodiments of the present invention will further become evident to one skilled in the art after a review of this specification, claims and the attached drawings,

BRIEF SUMMARY OF THE INVENTION

In accordance with the present invention, there is provided a system for machine tool operations optimization comprising a computer having a processor, memory and access to computer readable media; a database containing vibration data associated with at least one machine tool; a computer program stored on the computer readable media where the computer program executes the steps of: determining optimal machining parameters for a machine tool fro the vibrational data associated with that machine tool; calculating an amount of profit improvement gained by adopting the optimal machining parameters; and providing an electronic communication containing the optimal machining parameters and the calculated amount of profit improvement gained b adopting the optimal machining parameters.

This summary outlines rather generally the features and technical advantages of one or more embodiments of this disclosure in order that the following detailed description may be better understood, Additional features and advantages of this disclosure may also be determined after reading this specification and claims with the accompanying drawings.

The foregoing paragraph has been provided by way of introduction. and is not intended to limit the scope of the invention as defined by this specification. claims and the attached drawings,

BRIEF DESCRIPTION OF THE DRAWINGS

The invention will be described. by reference to the following drawings, in which like numerals refer to like elements, and in which:

FIG. 5 is a screen shot depicting an example of an Ap Op input form;

FIG. 6 is a screenshot depicting an example of an Ap Op report;

FIG. 8 is a screenshot depicting an example of an Ap Op report; and

Figure 1:
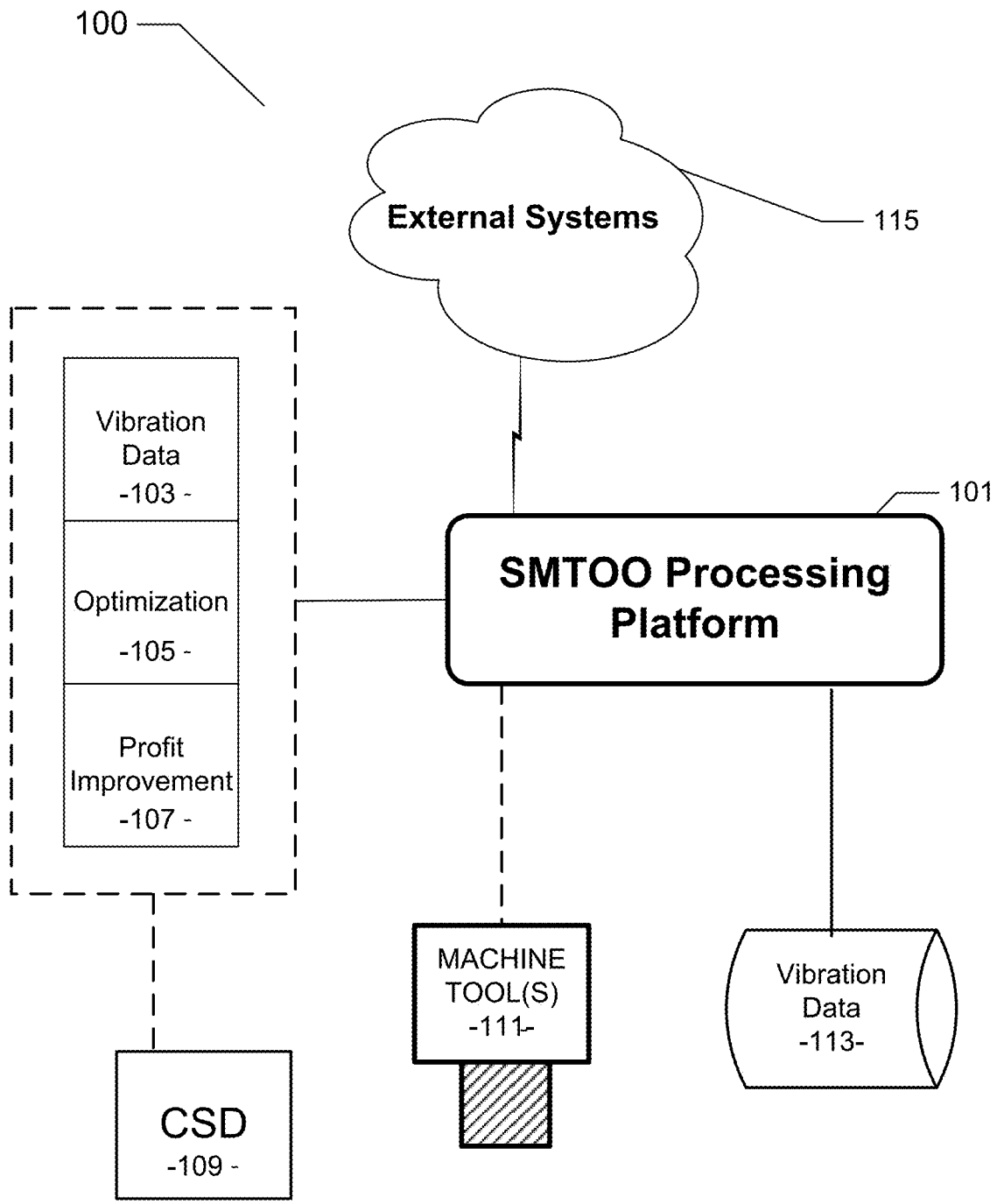
FIG. 1 is a block diagram of the system for machine tool operations optimization.

The present invention will be described in connection with a preferred embodiment: however, it will be understood that there is no intent to limit the invention to the embodiment described. On the contrary, the intent is to cover all alternatives, modifications, and equivalents as may be included within the spirit and scope of the invention as defined by this specification, claims and the attached drawings.

DESCRIPTION OF THE PREFERRED EMBODIMENTS

For a general understanding of the present invention, reference is made to the drawings. In the drawings, like reference numerals have been used throughout to designate identical elements.

Disclosed is a system and method for machine tool operations optimization that includes system and method components, a detailed disclosure of each being provided herein. The system includes, but is not limited to, a computer having a processor, memory and access to computer readable media; a database containing vibration data associated with at least one machine tool; a computer program stored on the computer readable media where the computer program executes the steps of: determining optimal machining parameters for a machine tool from the vibrational data associated with that machine tool; calculating an amount of profit improvement gained by adopting the optimal machining parameters; and providing an electronic communication containing the optimal machining parameters and the calculated amount of profit improvement gained by adopting the optimal machining parameters. In some embodiments of the present invention, the optimal machining parameters are provided to an electronic interface of a machine tool (see for example FIG. 2, 213). The optimal machining parameters comprise spindle speed, depth of cut, width of cut, and feed rate. An electronic. interface to a machine tool includes,. but is not limited to, the MTConnect standard (ANSI/MTC1.4-2018 and related standards), CAM Software such as Mastercam®, a registered trademark of CNC Software, FIX of Tolland, Conn., USA, Esprit CAM software from DP Technology, and the like, as well as digital tool and productivity management software, and also other software, hardware, firmware, or optical based interfaces.

Methods of the present invention include determining optimal machining, parameters for a machine tool and calculating an amount of profit improvement gained by adopting the optimal machining parameters, Further methods and systems of the present invention include, but are not limited to, calculating a quantity of cutting tools and material stock from the optimal machining parameters, predicting, lead times for the quantity of cutting took and material stock, and providing such information to a computer based ordering or purchasing system. In some embodiments of the present invention, purchasing options for the quantity of cutting took and material stock, needed for the specific job are provided. In some embodiments of the present invention, a quantity of cutting took and material stock to carry in inventory is determined, and may, in further embodiments, be provided to a purchasing system.

Turning now to the figures, FIG. 1 is a block diagram 100 of the system for machine tool operations optimization. A machine tool is any machine capable of manufacturing operations such as, but not limited to, cutting, milling, drilling, and the like. A System For Machine Tool Operations Optimization (SMTOO) processing, platform 101 can be seen that comprises a computer having a processor, memory and access to computer readable media, Computer-executable instructions are compiled or otherwise provided by way of a computer program or programs that are resident on, or accessible by, the SMTOO processing platform 101. The SMTOO processing platform 101 may be a single computer, or may be an arrangement of networked computers. A database or similar data structure that contains vibration data 113 is connected to the processing platform either directly or by way of a network and, in some embodiments of the present invention, intermediary device(s). The vibration data 113 contains information related to the vibration and harmonics of a machine tool when struck with an object, essentially providing a vibratory signature that can be used to control and reduce machine tool chatter. Vibration data 113 may also be specific to the type of material being machined. The vibration data 113 is used to optimize the throughput of the machine tool, as the vibration data 113 allows for the determination of optimal rotational speed, depth of cut, width of cut, feed rate and other such parameters that, when applied, will reduce machine tool chatter. The machine tool may include a tool holder, a tool, a tooling machine, and/or a spindle. This optimization improves throughput, reduces tool wear, improves the life of the tool, the tool holder and the machine. Such optimization may be used for various tooling processes, including, but not limited to, milling, cutting and drilling. During machine tool operation, the tool may encounter vibrational frequencies that are detrimental to the operation being performed. Such unwanted vibrational frequencies may cause chatter of the machine tool and resulting inefficiencies. Chatter is a vibration caused by the modulation of cutting force and cutter vibration that occurs at certain rotational speeds with certain cutting parameters such as depth and speed of cut. It is an unwanted effect that reduces machining efficiencies and results in excessive tool wear. Vibration data 113 is typically collected through a tap test, where a sensor (for example, a microphone or a transducer) is placed on the machine tool and a component of the machine tool such as the cutting head is tapped with an object such as a hammer so that the resulting vibration data is detected by the sensor and recorded either in analog or digital form. The tap test emulates vibration encountered during, operation of the machine such that cutting parameters can be modified to optimize machine tool efficiencies. As seen in FIG. 1, vibration data 113 may be collected for one or more machine tools and stored in a database or other data structure. In some embodiments vibration data 113 may be aggregated, purchased, transferred, or otherwise gathered from an external source or a plurality of sources. A computer program may be employed to determine optimal machining parameters based on the vibration data 113 that is specific to the machine tool being used. Examples of such techniques lay be found in United States Patent Application Publication US 2019/0061083 A1 to Trecapelli and Barton, the entire disclosure of which is incorporated herein by reference in its entirety.

In some embodiments of the present invention, as the machine tool wears, the associated vibration data may change, and as such, the vibration data is updated during the late of the machine tool.

Thus, as seen in FIG. 1, vibration data 103 is used for machine tool by determining optimal machine tool operating parameters. When optimal machine tool operating parameters are established and used in production, profit improvement in the form of improved throughput is realized. A computer program may be employed that uses vibration data 103 that is specific to a machine tool of interest and uses an optimization function 105 to optimize machine tool efficiency by establishing cutting speed, depth of cut and speed of cut that eliminates or reduces unwanted machine tool chatter. Once machine tool optimization parameters 105 are established, profit improvement 107 is calculated by determining the cost savings in work piece production resulting from use of the optimization parameters 105 for that machine tool. While machine tool optimization 105 is important to any machining operation, determining and understand ng the profit improvement 107 associated with these optimization parameters 105 represents a significant improvement to machine shop operations. From the optimization parameters 105 and associated profit improvement 107, supply chain parameters such as end tool and material stock lead times, supplier variability, cost savings and profitability management and improvement can also be determined, further adding to the novelty and usefulness of the present invention and the various embodiments described herein, In some embodiments of the present invention, a Cost Savings Documentation (CSD) module 109 may be employed. The CSD module 109 provides information related to cost savings and profitability indication for various optimization and product selections. CSD and profitability indication are further described in U.S. Pat. No. 10,733,653 B2 entitled System And Method For Alternative Product Selection And Profitability Indication to Smalley et al., the entire disclosure of which is incorporated herein by reference in its entirety. In addition, U.S. Pat. No. 10,204,251 B1 entitled Network Based Vendor-Managed Inventory System And Method to Fenty, III et al. and U.S. Pat. No. 9,053,452

B2 entitled Supply Ordering System And Method to Bonomo et al. are also incorporated herein by reference in their entirety.

Optionally, as shown in FIG. 1, the System For Machine fool Operations Optimization (SMTOO) Processing Platform 101 may interface to a machine tool 111 such that operating parameters that are determined by the SMTOO Processing Platform 101 are electronically communicated to the machine tool 111 for direct or indirect control thereof. In some embodiments of the present invention. the machine tool 111 will also electronically communicate operating and performance parameters to the SMTOO Processing Platform 101. In some embodiments of the present invention. external systems 115 are interfaced with the SMTOO Processing Platform 101. Examples of such external systems include, but are not limited to, a computer based purchasing system, a computer based ordering system, a website. or the like.

In addition to optimization parameters and profit improvement data, the SMTOO processing platform 101 may also provide purchasing options for the quantity of cutting took and material stock needed for a specific job. The SMTOO processing platform may also determine a quantity of cutting tools and material stock to carry in inventory, and may also provide such information to a purchasing system, such as, but not limited to, an external purchasing system or a vendor managed system.

Figure 2:
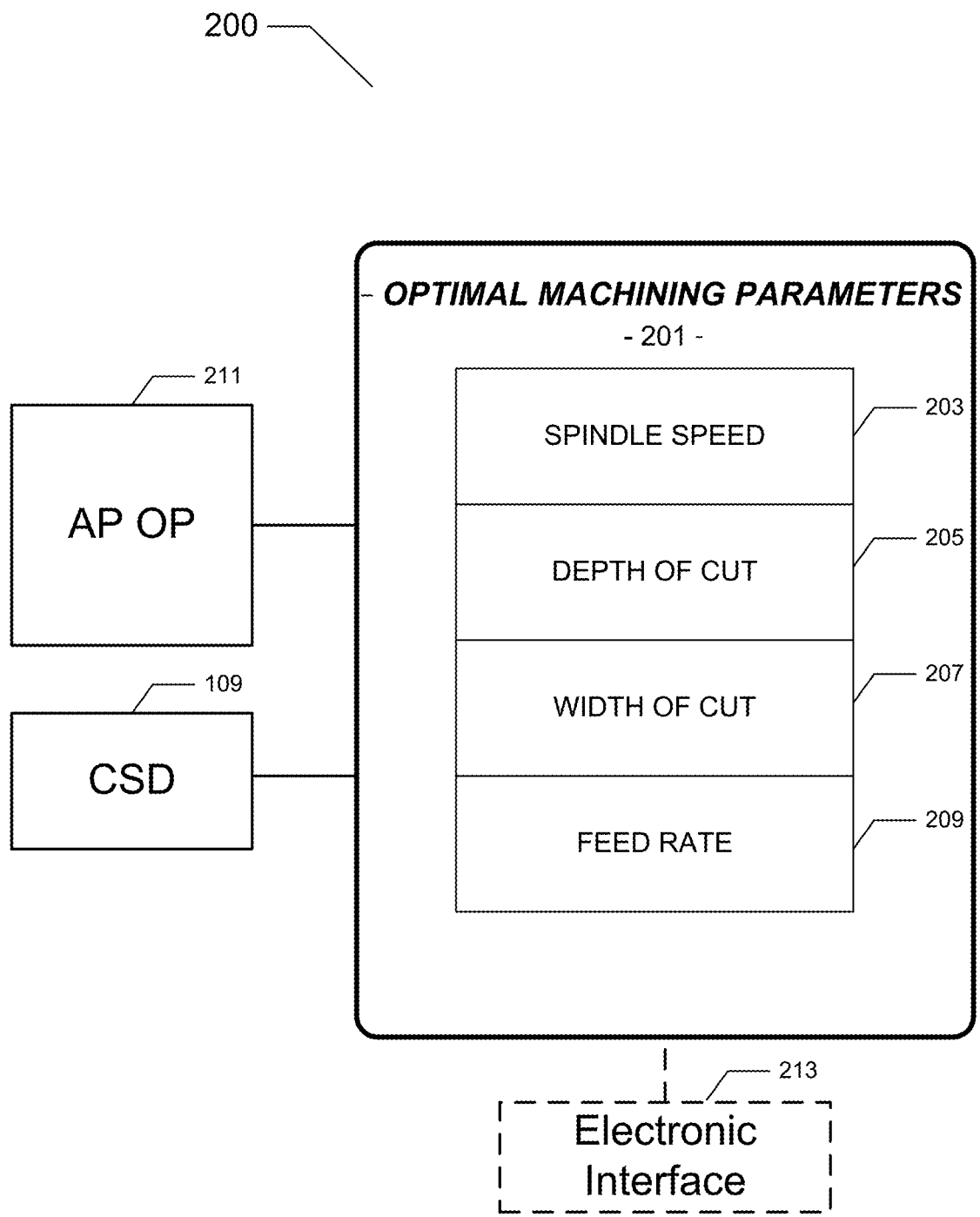
FIG. 2 is a block diagram of one embodiment of the present invention.
Figure 3:
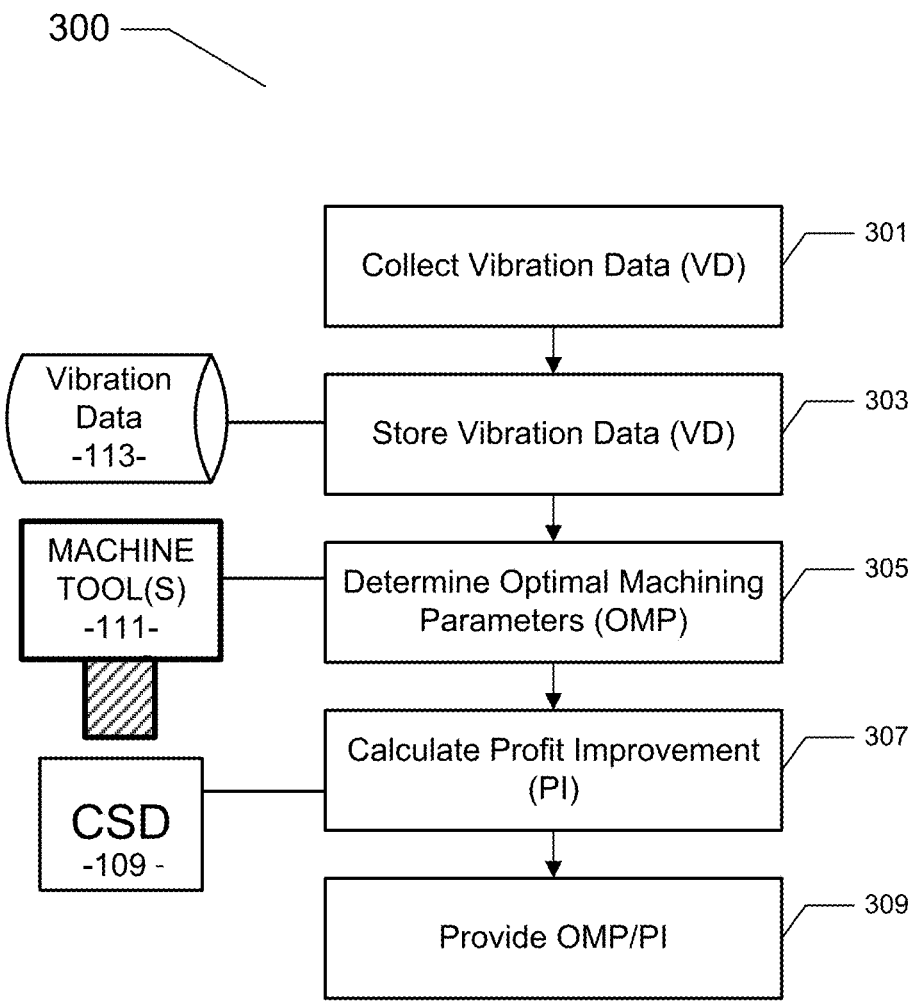
FIG. 3 is a flowchart depicting a method of the present invention.

FIG. 2 is a block diagram of one embodiment of the present invention 200 where the optimal machining parameters 201 that are generated from the SMTOO processing platform 101 are electronically provided to a CSD module 109 and an AP OP module 211. The optimal machining parameters 201 include spindle speed 203, depth of cut 205, width of cut 207 and feed rate 209. The CSD module 109, having been previously described herein, provides information related to cost savings and profitability indication for various optimization and product selections. The AP OP module 211, or application optimization module, provides details on the amount of profit improvement gained by adopting the machine tool optimization parameters created by the SMTOO processing platform and compares prior operating parameters to the machine tool optimization parameters created by the SMTOO processing platform, FIG. 3 is a flowchart depicting a method of the present invention 300 In step 301, vibration data (VD) is collected. As previously described, vibration data ma he collected directly from a machine tool using a technique such as a tap test, where a sensor (for example, a microphone or a transducer) is placed on the machine tool and a. component of the machine tool such as the cutting head is tapped with an object such as a hammer so that the resulting vibration data is detected by the sensor and recorded either in analog or digital form. The tap test emulates vibration encountered during operation of the machine such that cutting parameters can be modified to optimize machine tool efficiencies. Vibration data (VD) may also be collected from an external or indirect source or sources such as external databases of vibration data, computer based vibration data calculations, and, the like. Once collected in step 301, vibration data (VD) 113 is stored in a database or other data structure in step 303. In sonic embodiments vibration data 113 may be aggregated, purchased, transferred, or otherwise gathered from an external source or a plurality of sources. In step 305, optimal machining parameters (OMP) for a specified machine tool are determined from the stored vibration data. These optimal machining parameters (OMP) include, but are not limited to, spindle speed, depth of cut, width of cut, and feed rate. In step 307, profit improvement (PI) is calculated based on the amount of profit improvement gained by adopting the Optimal Machining Parameters (OMP) of step 305 and compares prior operating parameters to the Optimal Machining Parameters (OMP) of step 305. The Profit Improvement (PI) is used by the CSD module 109 and the AP OP module 211. Lastly, in step 309, the Optimal Machining Parameters (OMP) and the Profit Improvement (PI) are provided by way of a report, a graph, an electronic communication, or the like.

Figure 4:
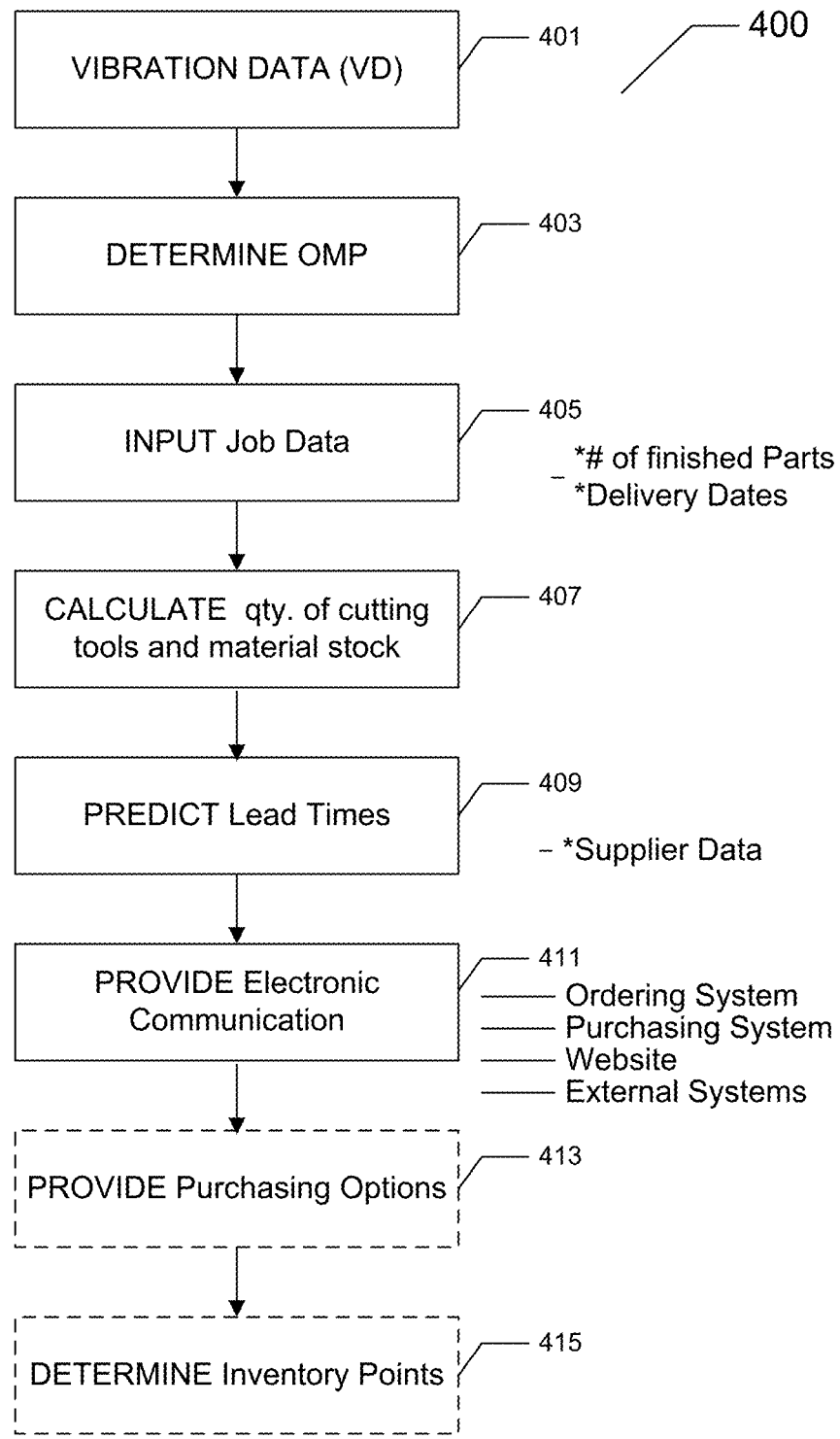
FIG. 4 is a flowchart depicting one embodiment of a method of the present invention.

FIG. 4 is a flowchart depicting one embodiment of a method of the present invention 400. The methods described herein are computer implemented methods where a computer having a processor, memory and access to computer readable media is used to execute a computer program or programs that in turn perform the steps described. The computer program or programs include computer-executable instructions where the computer program or programs may be created using a variety of programming languages. including. but not limited to, Java™, Javascript, Python, HTML, Perl, C++, C#, Visual Basic. PHP, Ruby, Swift, SQL, COBOL, and the like. The computer program(s) are stored on computer-readable medium and includes any non-transitory medium.

It should be noted that in some embodiments of the present invention a dashboard or dashboards may be presented as a graphical display on a computer or electronic device where the dashboard organizes information and also provides the ability to search by machine make, model, supplier SKU number for the toolholder or cutter, and the like. Dashboards can also he used to provide vibration analysis information when direct tap test signatures cannot be obtained, and may be referred to as predictive milling or receptance coupling substructure analysis (RCSA). Receptance Coupling Substructure Analysis (RCSA) is a technique of generating Dashboards by coupling 3D Finite Element Analysis (FEA) models of toolholders and cutters with previously obtained dynamic signatures of specific machine tool models. The signatures are derived from tap-tests of one instance of a machine model and can he reused on any instance of that make and model encountered. While not as accurate as a direct measurement, RCSA can be used for the following:

1. Quickly testing various tool assembly configurations to determine the winner without having to buy the components, assemble them and tap-test them in the target machine. The winner is tap-tested to generate the optimum dashboard.

2. Testing special tools and testing revisions prior to their manufacturer.

3. Providing dashboards for small machine shop operations.

As recited previously, vibration data is used to determine optimal machining parameters. therefore in step 401 vibration data (VD) is gathered or otherwise retrieved and used to determine optimal machining parameters (OMP) in step 403. In the method 400 of FIG. 4, job data is input in step 405. Job data includes, but is not limited to, the number of finished parts desired and the delivery date or dates for the finished parts. Once job data is input in step 405, the computer program calculates the quantity of cutting tools and material stock needed to complete the job based on the job data entered in step 405. The computer program next predicts lead times of the items needed to complete the job (cutting tools and, material stock as well as expendables) in step 409 based on supplier data received by the) computer program. In some embodiments of the present invention, the job data input in step 405 is electronically communicated to a supplier such that the supplier (or the supplier's computer system) responds with lead times for each item. In some embodiments of the present invention, the computer program requests lead time and pricing information from more than one vendor to facilitate the selection of the best price and delivery date for the) required items. Once job data is processed and lead times and costs are determined, an electronic communication is provided in step 411 to a selected supplier where the electronic communication contains job specific ordering information such as material stock and cutting tool details. The electronic communication may be in the form of an email, or may, in some embodiments of the present invention, be an electronic communication to an ordering system, a purchasing system, a website, or another external system that facilitates ordering of job material. To further optimize machine tool operations, in some embodiments of the present invention, purchasing options are provided in step 413 to allow selection of optimal material costs and delivery dates. Additionally, in some further embodied tents of the present invention, inventory points and reorder points may he determined in step 415. In some embodiments of the present invention. predictive analytics of a machine tool may be provided. Such predictive analytics may span multiple machine tools, and may include such items as maintenance, production, throughput, and the like.

Thus, it can he seen that machine tool operations optimization includes not only optimal machine tool cutting parameters, but also machine tool job optimization by way of materials management and cost management that is integrated with machine tool cutting parameters.

While the present invention and the various embodiments described and depicted herein produce a variety of input and output screens that are physically represented on a computer display, a smart phone display, a printed sheet, or the like, several representative screen shots are provided herein. These screen shots are not intended to limit the scope of the invention, but rather, are intended to be representative examples only.

Figure 5:
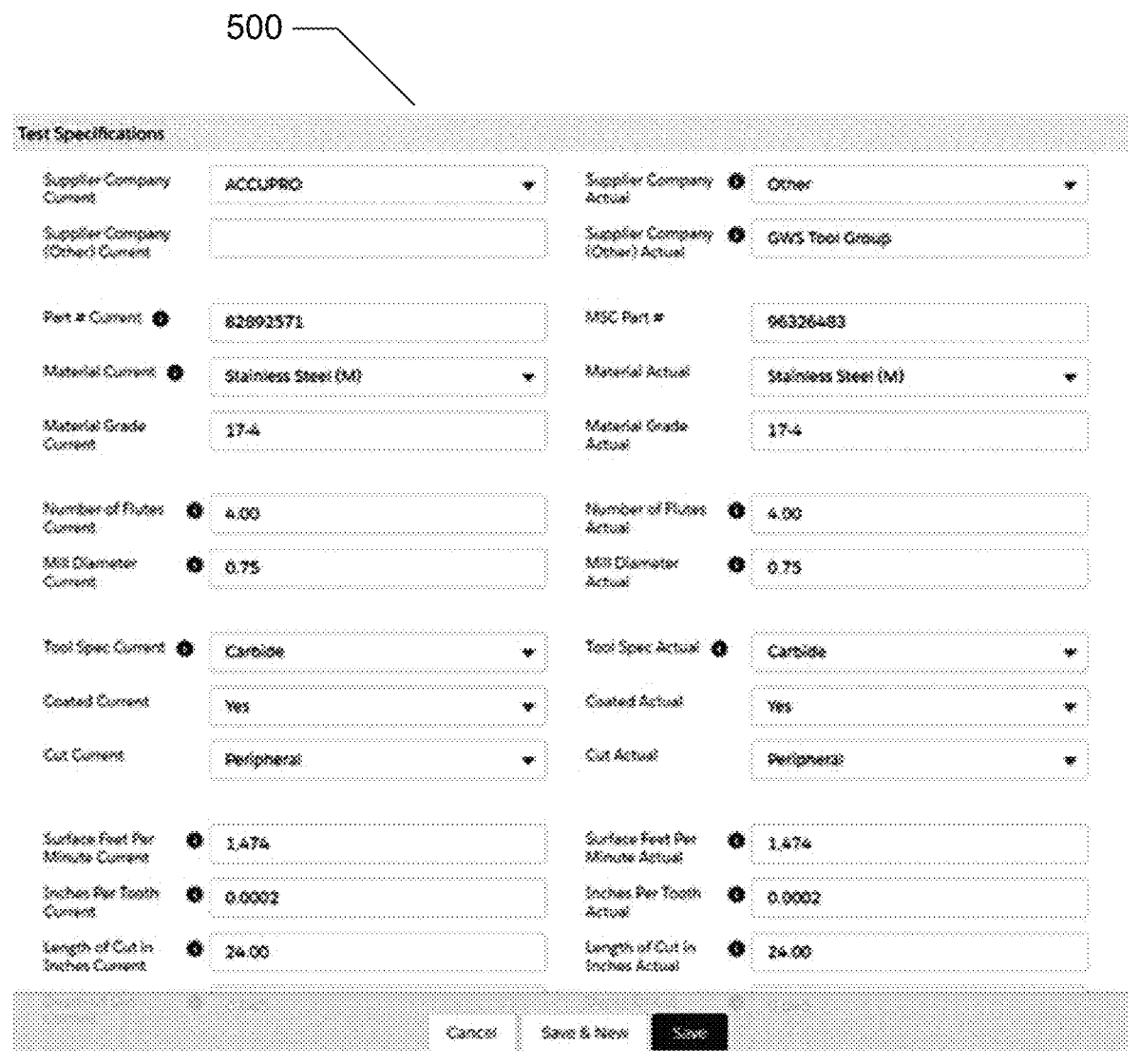

For example, FIG. 5 is a screen shot depicting an Ap Op input form. The form 500 may, in some embodiments of the present invention, be displayed on a computer screen, a smart phone screen, or the display of an electronic device. The form 500 is intended to be populated by a user such as a machine shop operator, or a supplier to a machine shop. The form 500 provides input to the Ap Op module 211. The input includes. but is not limited to, the name of the current supplier company, part number or part numbers of interest, current material being used along with the material grade and other defining material characteristics. Specifications of the machine tool such as mill diameter, number of flutes, material specifications of the machine tool (such as metal type and coating), type of cut being made. as well as machining speed parameters such as surface feet per minute, length of cut, and the like are provided. These parameters are then used to drive the Ap Op function, which in turn provides optimal machining parameters as well as cost saving improvement data.

FIG. 6 is a screenshot depicting an Ap Op report. The exemplary Ap Op report depicted in FIG. 6 provides information on the current milling parameters as well as the proposed (MSC Actual) milling parameters, which includes both machining parameters as well as cost savings, with specific line items for cost savings. It should be noted that in some embodiments of the present invention, a comparison of multiple tools can be presented as a Virtual Runoff application where multiple tools are compared based on their specific machining characteristics as determined from vibration data. From these comparisons, the lowest cost and highest productivity tool(s) are determined. It should be noted that lowest cost and highest productivity tools may be separate tools. In the Virtual Runoff application, a technique such as pattern recognition (for example, curve fitting) is employed with rules and constraints to identify the one best speed and depths of cut combinations from within a graph of multiple lobes or data points. The findings are then presented in a comparison al multiple tools where the lowest cost and highest productivity tool(s) are calculated based on multiple decision matrices that may, in some embodiments of the present invention, he user defined. The screenshot depicted in FIG. 6 compares current machining parameters with recommended machining parameters (MSC actual) as well as projected cost savings. The information for each column in this example includes supplier name, tool part number, material, material grade, number of flutes, number of edges/insert, cutter diameter, number of effective teeth, surface feet/minute, inches/tooth, coolant, insert number, insert grade, total depth of cut, width al cut (WOC), cut. length of cut in inches, number of passes. number of parts/index, index time in seconds, annual part production, burden rate/hour, insert cost/each, tooling cost cutter body, additional cost savings, and a description of additional cost savings. Each column in this example then further defines machining parameters such as revolutions/minute, inches/revolution, inches/minute, linear distance/index in inches, cycle time/part in seconds, annual insert usage, material removal rate, percentage productivity increase, increased annual part production. and annual cycle time savings in hours. In each column in this example, machining cost is listed, such as annual insert cost, tool change cost/year, cycle time cost year, annual insert cost savings, and annual tool change cost savings. Each column is then itemized to provide annual cost savings for the current and at least one recommended solution.

Figure 7:
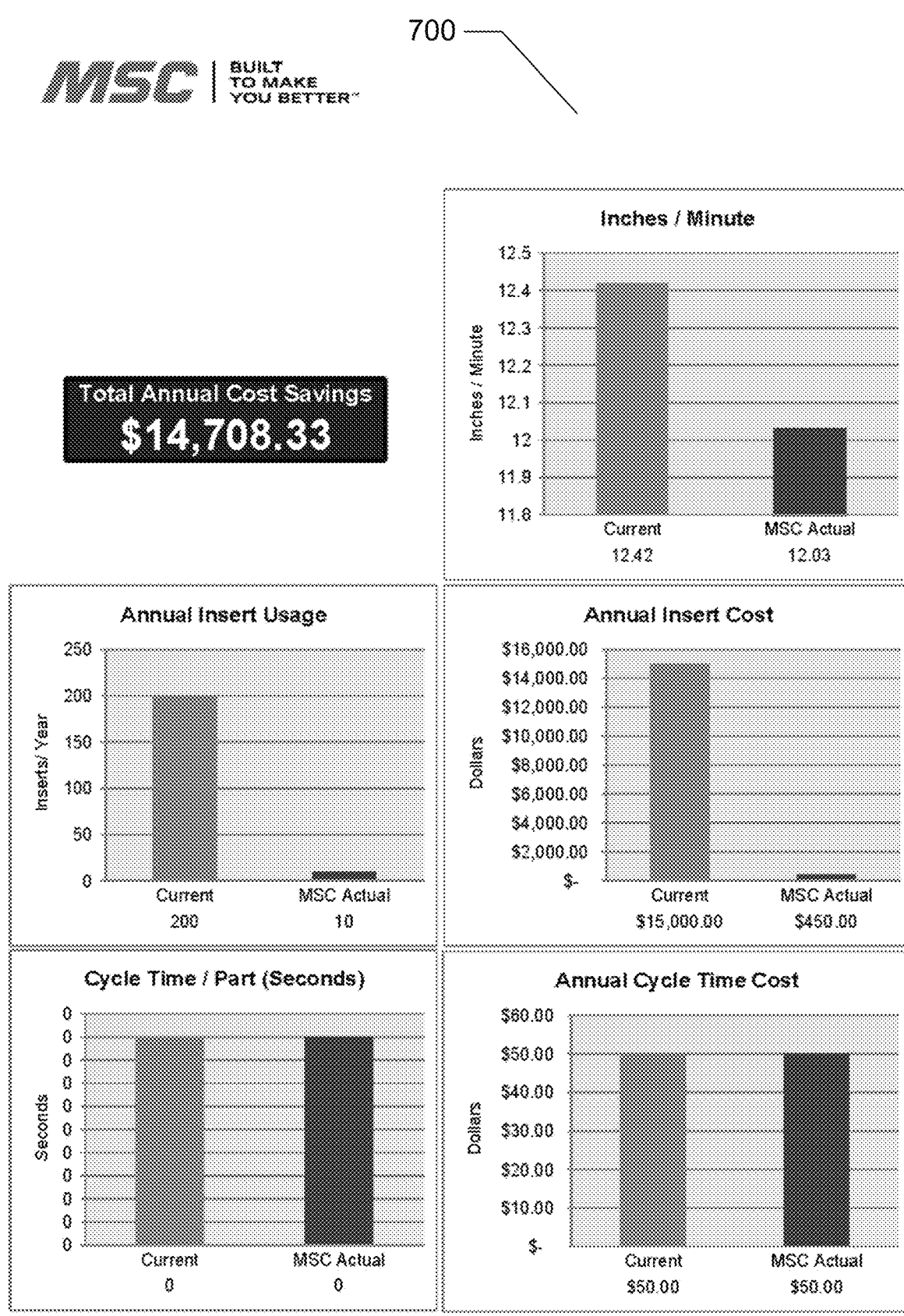
FIG. 7 is a screenshot depicting an example o an Ap Op graphical output.

A variety of representations of annual cost savings can be provided with the present invention, and such depictions may in some embodiments be customized or user configurable. Often a graphical representation or representations are employed. FIG. 7 is a screenshot depicting an Ap Op graphical output where the total annual cost savings are depicted along with a series of bar charts describing how the projected cost savings will be achieved. In this example, a single solution (MSC actual) is depicted alongside the current machining configurations. Of course additional or alternative solutions could be presented in graphical or table formats in sonic embodiments of the present invention. In the first graph, a comparison of current and proposed solutions in terms of feed rate (in this example in inches per minute) is depicted. The second graph compares annual insert usage and the third graph depicts annual insert cost. The last two graphs in this example depict a comparison of cycle time per part (in seconds) and annual cycle time cost.

Figure 9:
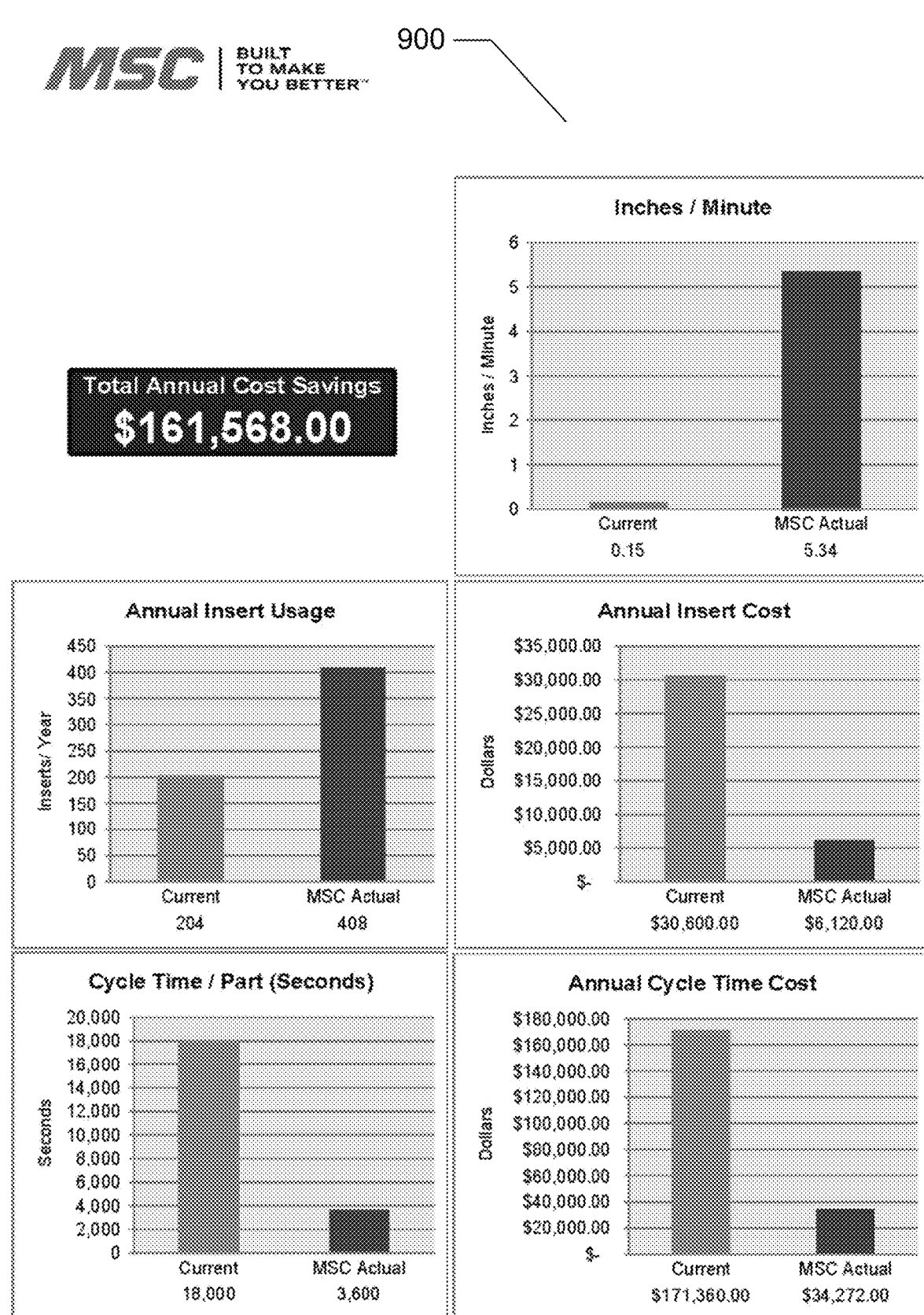
FIG. 9 is a screenshot depicting an example of an Ap Op graphical output.

Another non-limiting example of an Ap Op report and related graphical output can be seen in FIGS. 8 and 9, where indexable drilling parameters are analyzed. Additional machine tool operations may also be analyzed, optimized and presented in a similar manner to that depicted in FIGS. 6-9.

Having described and illustrated the principles, components and methods of the present invention by reference to one or more preferred embodiments, it should be apparent that the preferred embodiment(s) described and envisioned herein may be modified in arrangement and detail without departing from the spirit and broad scope of the present invention, and that these modifications and variations are to be considered and construed as being included in the present application and invention described herein.

What is claimed is:

1. A system for machine tool operations optimization comprising:
   a computer having a processor, memory and access to computer readable media;
   a database containing vibrational data associated with at least one machine tool;
   a computer program stored on the computer readable media where the computer program executes the steps of:
   determining optimal machining parameters for a machine tool from the vibrational data associated with that machine tool;
   inputting the number of finished parts and delivery dates for a specific job;
   calculating a quantity of cutting tools and material stock needed for the specific job by adopting the optimal machining parameters;
   predicting lead times for the quantity of cutting tools and material stock calculated; and
   providing an electronic communication containing die calculated quantity of cutting tools and material stock and the predicted lead times for the quantity of cutting tools and material stock.

2. The system of clan 1, wherein the electronic communication is provided, to a computer based purchasing system.

3. The system of claim 1, wherein the electronic communication is provided to a computer based ordering system.

4. The system of claim 1, wherein the electronic communication is provided to a website.

5. The system of claim 1, wherein the computer program further comprises the step of providing purchasing options for the. quantity of cutting tools and material stock needed for the specific job.

6. The system of claim 1, wherein the computer program further comprises the step of determining a quantity of cutting tools and material stock to carry in inventory.

7. The system of claim 1, wherein the computer program further comprises the step of providing predictive analytics of a machine tool.

* * * * *